Aug. 10, 1926.

R. C. BERGEMANN 1,595,815

CHICKEN NEST

Filed March 30, 1926

INVENTOR
Rudolf C. Bergemann
BY
ATTORNEY

Patented Aug. 10, 1926.

1,595,815

UNITED STATES PATENT OFFICE.

RUDOLF C. BERGEMANN, OF MILNOR, NORTH DAKOTA.

CHICKEN NEST.

Application filed March 30, 1926. Serial No. 98,432.

This invention relates to nests for fowls and more particularly to those that are protected against vermin.

An object of the invention is in the provision of a plurality of coops integrally built.

Another object is to provide means to store a quantity of liquid to be dispensed within the nests.

A further feature is in the provision of means whereby the liquid stored may be conveyed to the several nests and there be retained for some time.

These and other similar objects are accomplished by the construction, combination and arrangement of parts, hereinafter described and illustrated in the accompanying drawing, in which:—

Figure 1:
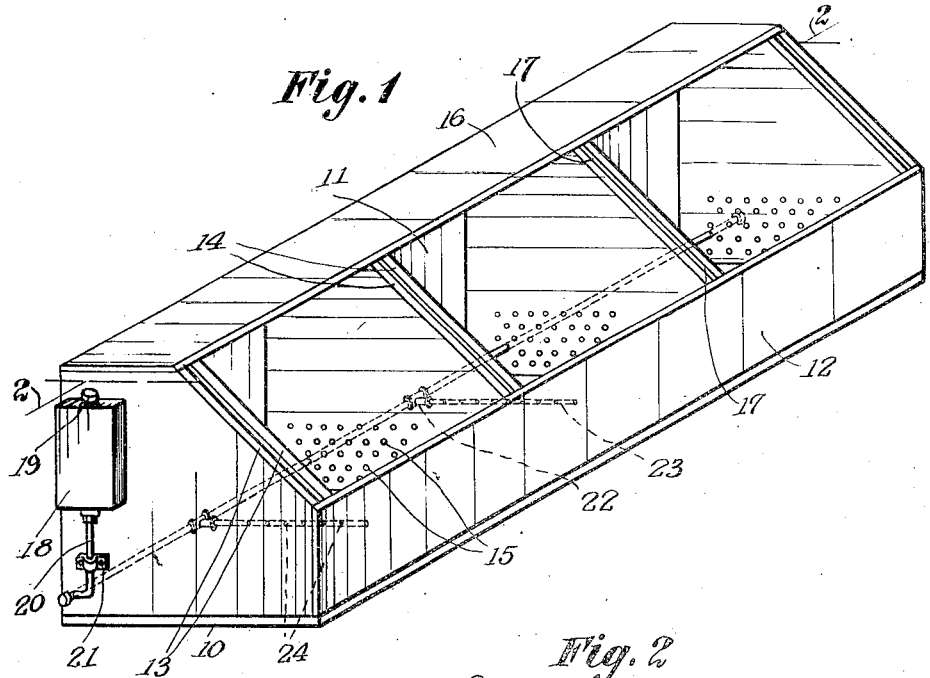
Figure 1 is a perspective view of the device made in accordance with the invention.
Figure 2:
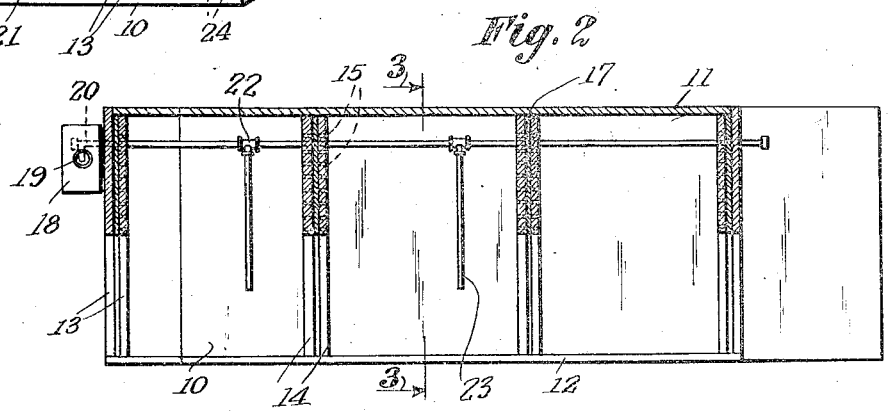
Figure 2 is a partial sectional, top plan view taken on line 2—2 of Figure 1.
Figure 3:
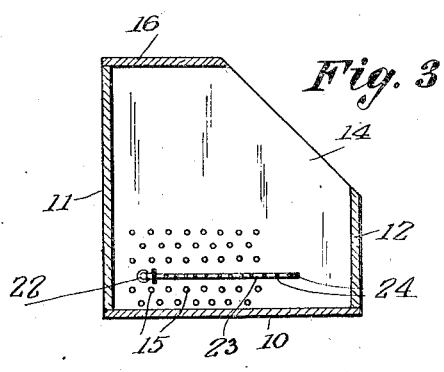
Figure 3 is a partial transverse sectional view taken on line 3—3 of Figure 2.

Referring more in detail to the drawing:—

The numeral 10 generally designates a base having a rear wall 11 attached thereto.

Rising from the forward edge of the base 10 is a front wall 12, lower in height than the rear wall 11.

Rigidly connected between the base, front and rear walls, at their ends are rectangular double side walls 13 having their forward upper corners removed as illustrated.

Spacedly mounted in the frame in a manner similar to the side walls 13 are a plurality of double walls 14 having holes 15 near the bases.

The flat level portion of the sides 13 and the walls 14 are covered by a top element 16 constituting a roof.

Set between each of the double walls 13 and 14 is a padding 17 used to soak up and retain the liquid to be used in making the nests lice-proof.

Rigidly mounted on the outer of the side walls 13 is a tank 18 having a cover 19 at its top and a pipe 20 leading downwardly from its lower end.

As the pipe 20 nears the base 10 it is bent at right angles toward the rear wall 11 and when it reaches a point just in advance of the wall 11 it is again bent at right angles to run parallel with the wall 11, whereupon it enters the coop through a hole in the wall 13 and extends the full length of the base 10, passing through the partitions 14.

The pipe is held from vibrating by a bracket 21 engaged around the pipe and to the side wall 13.

At some point within each partitioned space a T 22 is placed in the pipe 20 to engage an extension pipe 23, having holes 24, running parallel between the walls 14, through which the exterminator stored in the tank 18 may flow.

From the foregoing it may be seen that a device has been disclosed that affords ample means of ridding chicken coops of vermin which, when present, torment and annoy the fowl, thus interfering with the laying of eggs.

Having thus described my invention, what I claim as new and desire to secure by Letters Patent, is:—

1. A vermin-proof nest comprising a plurality of partitioned spaces, separated by double walls, a plurality of holes in said walls, padding between said walls and means to convey a disinfectant to said padding.

2. A vermin-proof nest comprising a plurality of partitioned spaces, separated by double walls, means between said double walls to retain a liquid, a tank on the outer of said walls, a pipe leading from said tank and extending through the full length of said nest and means connected to said pipe to spread a disinfectant liquid within said nest.

3. A vermin-proof nest comprising a plurality of partitioned spaces, separated by double walls, means between said double walls to retain a liquid, a tank on the outer of said walls, a pipe leading from said tank and extending through the full length of said nest, T's connected to said pipe within each spaced partition an extension toward the front of said nest connected to said T's and means in said extension to allow passage of a liquid therefrom.

In witness whereof I have affixed my signature.

RUDOLF C. BERGEMANN.